United States Patent
Hsieh et al.

(10) Patent No.: US 8,112,174 B2
(45) Date of Patent: Feb. 7, 2012

(54) PROCESSOR, METHOD AND COMPUTER PROGRAM PRODUCT FOR FAST SELECTIVE INVALIDATION OF TRANSLATION LOOKASIDE BUFFER

(75) Inventors: Jonathan T. Hsieh, Poughkeepsie, NY (US); Chung-Lung Kevin Shum, Wappingers Falls, NY (US); Charles F. Webb, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 12/036,398

(22) Filed: Feb. 25, 2008

(65) Prior Publication Data

US 2009/0216994 A1    Aug. 27, 2009

(51) Int. Cl.
G06F 12/10    (2006.01)
(52) U.S. Cl. ....................................... 700/207; 711/205
(58) Field of Classification Search .................. None
See application file for complete search history.

(56) References Cited

U.S. PATENT DOCUMENTS

| | | |
|---|---|---|
| 4,053,948 A | 10/1977 | Hogan et al. |
| 4,733,348 A | 3/1988 | Hiraoka et al. |
| 4,733,350 A | 3/1988 | Tone et al. |
| 4,821,171 A | 4/1989 | Calamari |
| 4,849,881 A | 7/1989 | Eguchi |
| 5,437,017 A | 7/1995 | Moore et al. |
| 5,574,878 A * | 11/1996 | Onodera et al. .............. 711/207 |
| 6,263,403 B1 | 7/2001 | Traynor |
| 6,604,187 B1 | 8/2003 | McGrath et al. |
| 6,738,888 B2 | 5/2004 | Chauvel |
| 6,901,540 B1 | 5/2005 | Griffith, Jr. et al. |
| 6,970,982 B2 | 11/2005 | Altman et al. |
| 7,197,601 B2 | 3/2007 | Slegel et al. |
| 7,284,100 B2 | 10/2007 | Slegel et al. |
| 2004/0230745 A1 * | 11/2004 | Navarro et al. ............... 711/127 |

FOREIGN PATENT DOCUMENTS

EP    0881581 A1    12/1998

OTHER PUBLICATIONS

Black, et al. "Translation Lookaside Buffer Consistency: A Software Approach". Association for Computing Machinery. 1989. pp. 113-112.
Austin, et al. "High-Bandwidth Address Translation for Multiple-Issue Processors". ISCA '96 May 1996 PA, USA. 1996. pp. 158-167.
Wood, et al. "An In-Cache Address Translation Mechanism". IEEE 1986. pp. 358-365.
Robbins, et al. "An Address Translation Simulator". SIGCSE' o5 Feb. 23-27, 2005. pp. 515-519.
Suzuki, et al. "Time Stamp Invalidation of TLB-Unified Cache and its Performance Evaluation". Dept. of Comput. & Math. Sci., Tohoku Univ., Sendai, Japan, Systems and Computers in Japan, vol. 30, No. 11, 94-106, Oct. 1999. Abstract only.
z/Architecture. "Principles of Operation". Sixth Edition (Apr. 2007). IBM. 1218 pages.

* cited by examiner

*Primary Examiner* — Hetul Patel
(74) *Attorney, Agent, or Firm* — Cantor Colburn LLP; John Campbell

(57) ABSTRACT

A processor including a microarchitecture adapted for invalidating mapping of at least one logical address to at least one absolute address, includes: at least one translation lookaside buffer (TLB) and a plurality of copies thereof; logic for independent indexing of each copy of the TLB; a plurality of comparators, each comparator associated with a respective output of each TLB set output for each TLB port, wherein each of the comparators is adapted for identifying mappings for invalidation; and logic for invalidating each identified mapping. A method and a computer program product are provided.

19 Claims, 3 Drawing Sheets

PROCESSOR, METHOD AND COMPUTER PROGRAM PRODUCT FOR FAST SELECTIVE INVALIDATION OF TRANSLATION LOOKASIDE BUFFER

BACKGROUND OF THE INVENTION

This invention relates to microprocessors that are used in large multi-processor systems, and particularly to microprocessors that implement a virtual memory system using translation lookaside buffers to negotiate between virtual addresses and absolute addresses.

A number of microprocessors have designs that include at least one translation lookaside buffer (TLB). The TLB is used to associate (i.e., to map) virtual addresses used by processes with addresses of absolute pages resident in memory. Since there is a limited number of absolute pages, the pages are often reused and therefore subject to allocation, reallocation or deallocation as needed. Some microprocessors (or simply "processors") implement an architecture that supports access key protection. That is, with access key protection, when an absolute page is allocated it is assigned a protection key. The key is saved in the TLB together with the translation mapping (the association between the virtual addresses and the absolute addresses). Sometimes, the absolute address is referred to as a "real address."

When access key protection is implemented, each software process requires an access key for accesses to absolute pages. Thus, when an absolute page is reallocated to a different process, the access key must be changed. This may be accomplished through a key changing instruction, such as a Set Storage Key Extended (SSKE) instruction. In order to be effective, the instruction must invalidate the old access keys for all mappings stored in any TLBs before the key update is performed. Although normal processing activities may have reduced copies of any mapping by the time the page is reallocated, it is important that the old access keys be removed or be invalidated. Accordingly, invalidation may be accomplished by broadcasting an Invalidate TLB Key (ITK) command from a master processor executing the SSKE instruction to all processors in the system (each having one or more TLBs) including the targeted absolute address from the process. The actual key changes cannot be completed by the master processor until all processors have completed the ITK. Additionally, these processors also cannot install new TLB mappings for the same address until the SSKE is completed by the master processor where new keys have been assigned.

In large multiprocessor systems, the SSKE instruction is commonly issued. Long execution delays associated with the SSKE command can be detrimental as associated latency limits overall system performance. One of the component of such delay is the time taken by individual processor to finish its ITK operation. Thus, completing the ITK command quickly is essential to improving SSKE latency and thus improving system performance.

In greater detail, a basic implementation involves searching the TLB at a rate of one index per cycle. A counter increments from 0 to the maximum TLB array index and all the mappings of a given index (i.e. sets) are compared against the ITK target each cycle. When a successful compare occurs, the appropriate index and set(s) must be invalidated by resetting the valid bit for the targeted key. The counter is stalled while the unset of the valid bit occurs and then continues to increment. The total latency for this implementation of ITK within each processor is highly dependent on the number of indices in the TLB (with some overhead for processing the command). On the other hand, a bigger TLB, which contains more rows or indices, is desired for better performance since that reduces TLB miss rate. The design point needs to be carefully balanced to obtain the best performance.

Another implementation uses content-addressable memory (CAM) to compare the ITK absolute addresses to all absolute addresses in the TLB. This allows the ITK to complete very quickly by identifying in a single cycle all the TLB mappings that may need to be invalidated. However, the CAM structure consumes a large amount of power and area in the processor core. This is problematic as modern processors have increasing area and power constraints as well as increasing frequency targets. Often times, in order to contain one of these factors, the actual compare width of the CAM will be limited to a partial range, potentially leading to unnecessary invalidations due to completion of imprecise comparisons. These extra invalidations can lead to performance degradation. A solution that meets the frequency, power, and area requirements while decreasing ITK latency as much as possible is required.

What are needed are techniques for improving performance of invalidation of TLB entries.

SUMMARY OF THE INVENTION

A processor including a microarchitecture adapted for invalidating mapping of at least one logical address to at least one absolute address, includes: at least one translation lookaside buffer (TLB) and a plurality of copies thereof; logic for independent indexing of each copy of the TLB; a plurality of comparators, each comparator associated with a respective output of each TLB set output for each TLB port, wherein each of the comparators is adapted for identifying mappings for invalidation; and logic for invalidating each identified mapping.

A method for invalidating mapping of at least one logical address to at least one absolute address, includes, for each translation lookaside buffer (TLB), of at least one TLB: initializing a plurality of counters according to a number of entries in the TLB; indexing arrays including absolute address information of the TLB; comparing each indexed TLB entry against a request for invalidation; and at least one of: unsetting at least one validation bit in the TLB; incrementing a counter including index information; identifying a set of TLB entries for invalidation and incrementally unsetting at least one validation bit for each TLB entry in the set.

A computer program product stored on machine readable media and including machine executable instructions for invalidating mapping of at least one logical address to at least one absolute address, the product including instructions for each translation lookaside buffer (TLB) of at least one TLB: initializing a plurality of counters according to a number of entries in the TLB; indexing arrays including absolute address information of the TLB; comparing each index against a request for invalidation; and at least one of: unsetting at least one validation bit in the TLB; incrementing a counter including index information; identifying a set of TLB entries for invalidation and incrementally unsetting at least one validation bit for each TLB entry in the set.

BRIEF DESCRIPTION OF THE DRAWINGS

Referring now to the drawings wherein like elements are numbered alike in the several figures, wherein.

DETAILED DESCRIPTION OF THE INVENTION

Disclosed herein are architecture, methods and apparatus for using multiple copies of a translation lookaside buffer (TLB). The multiple copies can be indexed independently, each with absolute address comparators, to quickly search for mappings that must be invalidated. This further provides for rapid invalidation of mappings, providing for subsequent generation of new access keys.

To provide perspective, consider that most superscalar microprocessors include a load store unit (LSU) that has two access pipes. The two pipes together naturally include either two copies of the TLB or a single copy that allows two independent indices to be read (i.e., two read ports) to support two parallel accesses to the data cache. The absolute address comparators used for ITK make use of the full width of the absolute address. This helps to avoid invalidating entries that are not targeted by the ITK. The power and area used by the comparators (one per copy per mapping per cycle) is also much less than that used by a CAM (size proportional to the total number of mappings in the TLB). In such embodiments, the total ITK latency is generally less than the basic implementation of searching one index per cycle, and can cut the latency in a half in comparison to a typical design.

In general, each address translation mapping stored inside the TLB includes a logical address tag, an absolute address, bits indicating validity of the mapping and the corresponding storage key, and other bits including the storage key. A logical TLB can be implemented by physically splitting the TLB into two physical arrays such that one provides a read from one index to get the mappings for comparison while another can contain the valid bits and virtual address bits for a write (invalidate) to another index. Alternatively, a logical TLB can provide a separate read and write port. Similary, these mappings can be duplicated in one or more physical arrays (N) each with one or more read ports (M), where each read port can be indexed independently. Additionally, multiple sets may be read simultaneously at each read port, where the number read corresponds to the set associativity (L) of the TLB.

Figure 1:
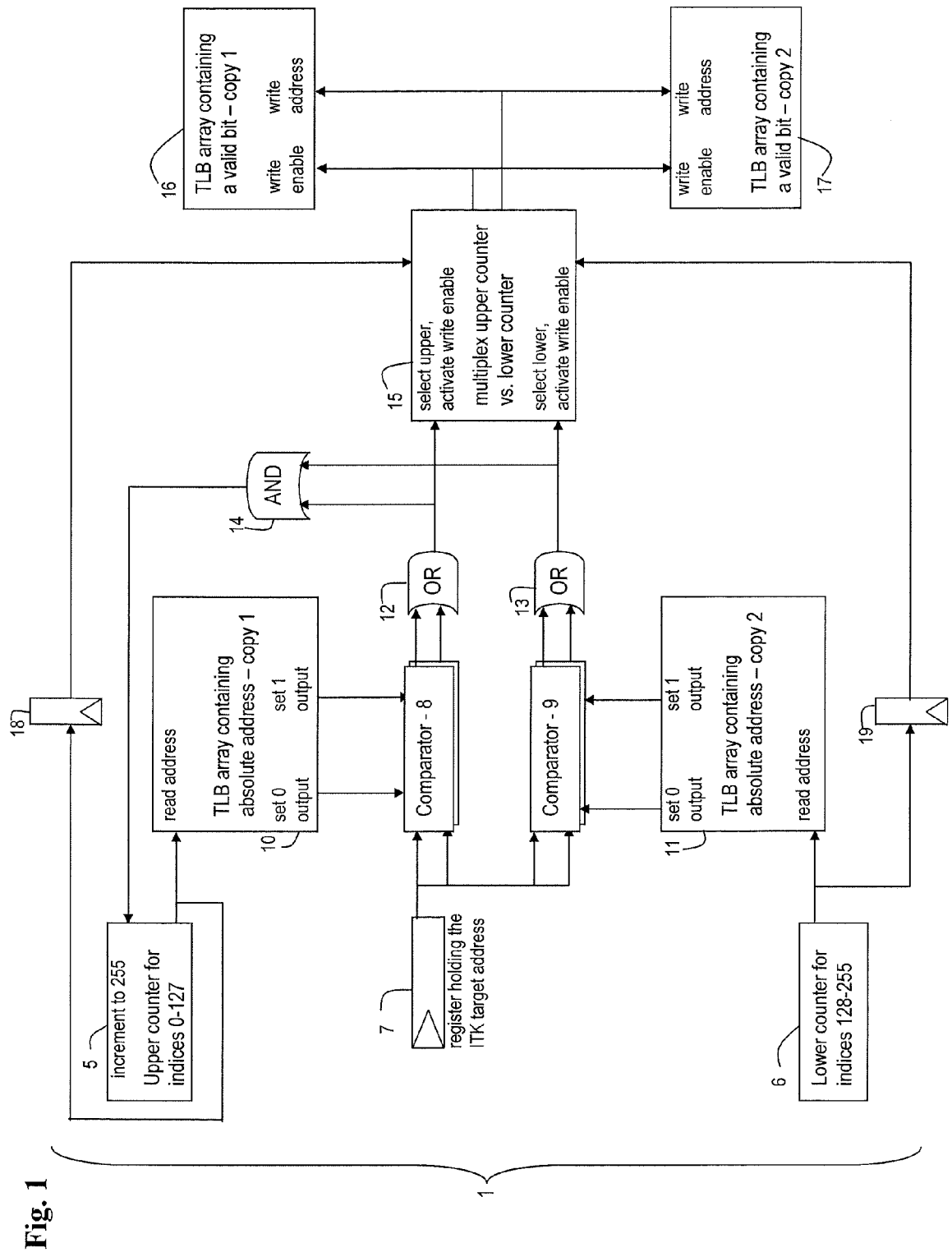
FIG. 1 illustrates aspects of a microarchitecture implementing two copies of a translation lookaside buffer (TLB) with two read ports each.

FIG. 1 illustrates aspects of an exemplary and non-limiting microarchitecture according to the teachings herein. In this example, the number of physical arrays (N) is two (2), the number of read ports (M) is one (1) and the number of sets being read (L) is two (2). In FIG. 1, a processor 1 includes two copies of the TLB (a first copy including items 10 and 16, a second copy including items 11 and 17). Each copy of the TLB (the first TLB copy 10/16, and the second TLB copy 11/17), include one read port and one write port. In this example, the TLB has 256 entries (Q) with two sets per entry. There are two (N*M=2) counters (an upper counter 5 and a lower counter 6), each of which increments through 128 indices (Q/(N*M)=256/2=128). There are also four comparators (N*M*L=2*1*2=4, labeled with reference numerals 8 and 9). Each comparator produces a hit signal. OR logic (reference numerals 12 and 13) is used to determine which of the hit signals is to be used to write the TLB. The hit signals activate a write mechanism 15 for an appropriate index (a lower counter 6 or an upper counter 5) and sets (whichever sets hit, if any). Since there is only one write port and both copies must be written at the same time, a hit from both the lower index and upper index in the same cycle (computed by the AND logic 14) will cause a write to the upper index and also cause the upper counter 5 to increment to 255 instead of 127. This dual hit case will increase the latency of ITK to be closer to 256 rather than 128, but is deemed to be a very rare occurrence in a typical system.

Figure 2:
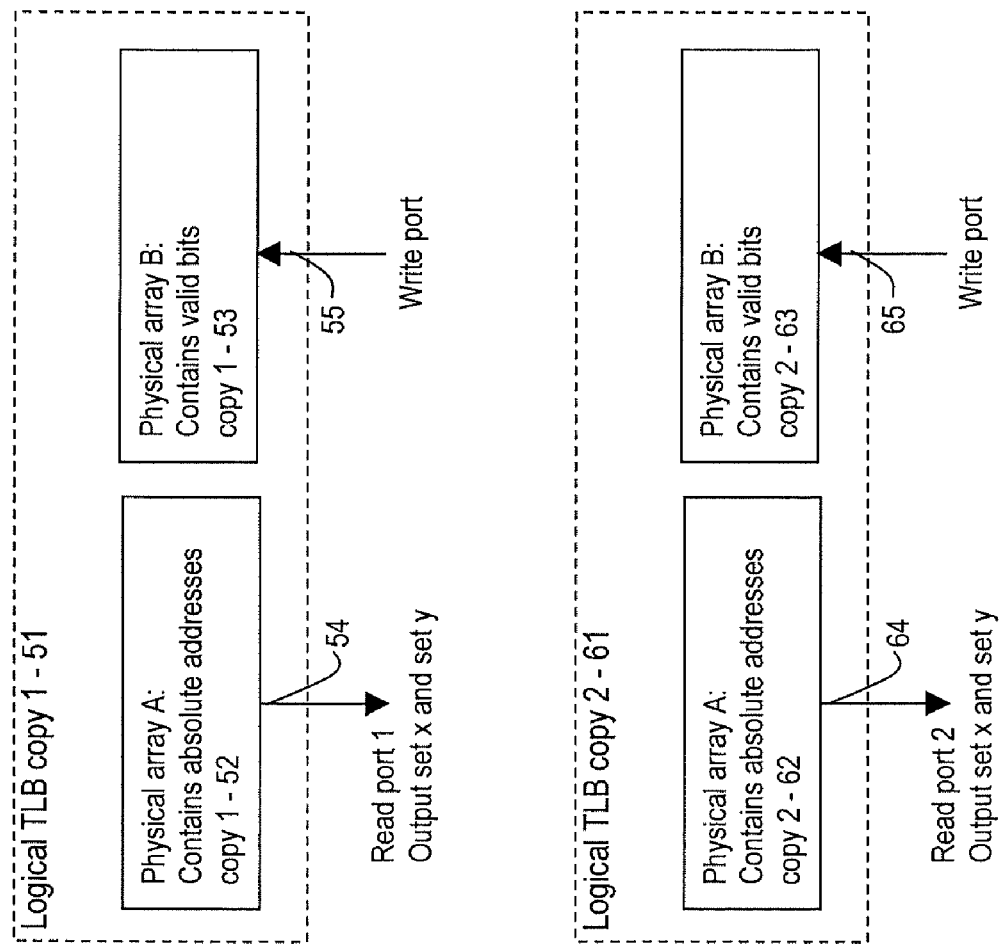
FIG. 2 illustrates relationships within logical copies of a TLB.

Referring now to FIG. 2, this illustration shows aspects of an embodiment where N=2, M=1, and L=2. A first copy of the logical TLB 51 includes physical array A 52 and physical array B 53. A second copy of the logical TLB 61, also includes corresponding physical array A 62 and physical array B 63. Each logical TLB (51 and 61) generally includes one read port (54 and 64, respectively). Each logical TLB (51 and 61) also generally includes one write port (55 and 65, respectively).

Figure 3:
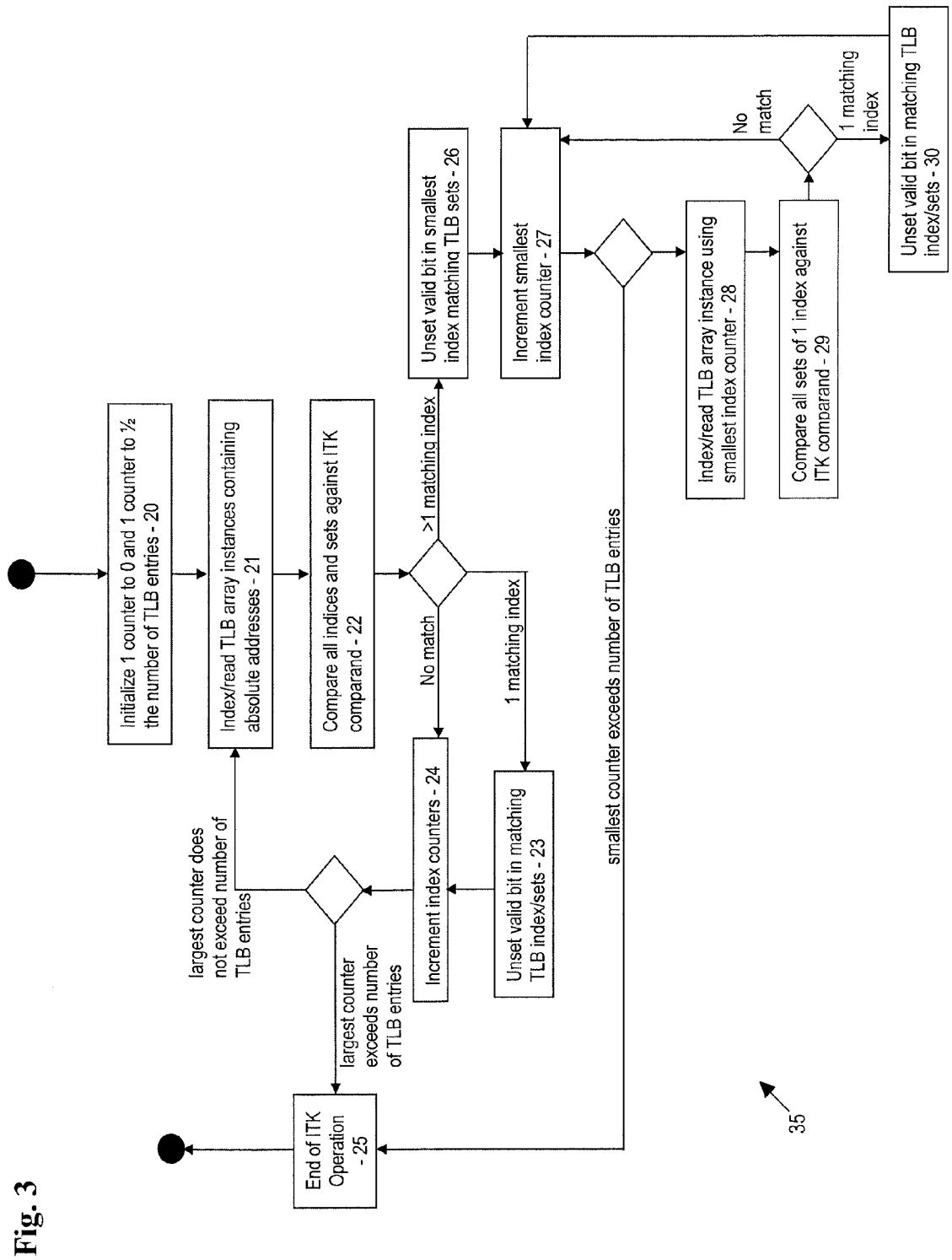
FIG. 3 is a flow chart exemplifying control logic when there is one write port for each instance of a TLB array.

FIG. 3 provides a flow chart with an exemplary control algorithm 35. In this example, the algorithm 35 starts with initializing counters 20. The algorithm 35 proceeds with indexing and reading TLB array instances that include absolute addresses 21. Then, comparison of indices and sets is performed against an ITK comparand 22 which is an absolute page address. If there is no match, then index counters are incremented 24. If the largest counter exceeds the number of TLB entries, then the ITK operation is ended 25. If not, the algorithm resumes indexing and reading TLB array instances that include absolute addresses 21. If there is one match, then the algorithm 35 unsets a valid bit in the matching TLB index/sets, and then index counters are incremented 24. If there is more than one matching index, the algorithm 35 proceeds with unsetting a valid bit in the smallest index matching TLB sets 26, incrementing the smallest index counter 27. If the smallest counter exceeds the number of TLB entries, then the ITK operation is ended 25. If the smallest counter does not exceed the number of TLB entries, then the algorithm 35 proceeds with indexing and reading TLB array instances using the smallest index counter 28, and then comparing all sets of one index against the ITK comparand 29. If there is no match from the comparing, then the algorithm 35 continues with incrementing the smallest index counter 27. If there is one matching index, then the algorithm 35 proceeds with unsetting a valid bit matching in TLB index/sets 30, and then continues with incrementing the smallest index counter 27.

Now with greater detail, consider that in this example, N=2 and M=1. In general, there are N*M*L comparators that determine if the N*M*L absolute addresses read each cycle from the TLB match a target of the ITK. Each of the N*M read ports accesses a subset of the TLB (which has Q indices) on consecutive cycles. Each read port will read at least Q/(N*M) indices such that the total ITK latency is about Q/(N*M) cycles. Whenever one or more of the N*M*L addresses match, the bit indicating validity is unset for those particular index and set combinations in all copies of the TLB. This is performed in parallel with continued reads to other indices. When the number of matches (P) exceeds a total number of simultaneous writes (R) that can be performed on the TLB arrays, the smallest number of simultaneous writes (R) indices are invalidated. The read port that began on the smallest index continues to increment to the largest index instead of stopping after Q/(N*M) indices. This ensures that the indices that could not be invalidated during the initial write of simultaneous write (R) indices are read again and invalidated. As mentioned earlier, in most systems, the mapping targeted by an ITK is usually not in a given TLB. It is also true that there is rarely more than one matching mapping in a TLB. Therefore, it is even less likely that more than R writes will be required in a given cycle (i.e. P>R). On average, the latency of ITK using this method will be about Q/(N*M) cycles because P is usually less than R.

Technical effects and benefits include a solution that meets the frequency, power, and area requirements while decreasing ITK latency. The solution provides for improving performance of access key issue.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A processor for invalidating a mapping of at least one logical address to at least one absolute address, the processor comprising:
    a plurality of copies of a translation lookaside buffer (TLB), the TLB configured to store entries that comprise mappings of logical addresses to absolute addresses;
    logic for independent indexing of each copy of the TLB, the indexing for each copy of the TLB comprising reading and outputting at least a portion of an entry via an output port located on the copy of the TLB;
    a plurality of comparators configured to operate in parallel with each other, each comparator associated with a respective output port located on one of the copies of the TLB, wherein each of the comparators is configured to identify mappings for invalidation; and
    logic for invalidating each identified mapping, the invalidating comprising unsetting a valid bit for the mapping between at least one logical address and at least one absolute address as invalid.

2. The processor as in claim 1, wherein a copy of the TLB comprises a logical TLB.

3. The processor as in claim 2, wherein the logical TLB comprises at least two physical arrays.

4. The processor as in claim 3, wherein a first array provides for the reading and a second array provides for writing during the invalidating.

5. The processor as in claim 2, wherein the logical TLB comprises a single array where a read from one index of the TLB can occur in parallel with a write to another index of the logical TLB.

6. The processor as in claim 2, wherein the logical TLB comprises a plurality of output ports.

7. The processor as in claim 6, wherein each output port can be indexed independently of other output ports.

8. The processor as in claim 1, wherein the entries further comprise at least one bit indicating mapping validity, at least one bit for validating a storage key, and at least one bit comprising the storage key.

9. The processor as in claim 1, wherein each comparator provides a hit signal to activate a write mechanism.

10. The processor as in claim 9, wherein the write mechanism writes to an entry in the plurality of copies of the TLB according to an index.

11. The processor as in claim 10, wherein the write mechanism is adapted for unsetting a validation bit of an entry in the plurality of copies of the TLB.

12. A method for invalidating mapping of at least one logical address to at least one absolute address, the method comprising, for each copy of a translation lookaside buffer (TLB) of at least one TLB:
    initializing a plurality of counters according to a number of entries in the TLB;
    indexing arrays comprising absolute address information of the TLB, the indexing responsive to the counters;
    comparing each indexed TLB entry against a request for invalidation, the comparing performed in parallel for each of the plurality of counters, the comparing resulting in one of no match, one match, and a plurality of matches;
    unsetting at least one validation bit in the TLB in response to the comparing resulting in one match;
    incrementing a counter comprising index information in response to the comparing resulting in no match; and
    identifying a set of TLB entries for invalidation and incrementally unsetting at least one validation bit for each TLB entry in the set in response to the comparing resulting in a plurality of matches;
    wherein the unsetting of the at least one validation bit invalidates a mapping between at least one logical address and at least one absolute address, the mapping corresponding to the identified set of TLB entries.

13. The method as in claim 12, wherein the TLB comprises a plurality of copies of the TLB.

14. The method as in claim 12, wherein the comparing comprises implementing at least one of OR logic and AND logic.

15. The method as in claim 12, wherein the TLB comprises at least one physical array, N, each physical array comprising at least one read port, M.

16. The method as in claim 15, wherein each read port can access an entry of the TLB with an amount of indices Q.

17. The method as in claim 16, wherein a latency for the method comprises no more than Q/(N*M) cycles.

18. A computer program product for invalidating a mapping of at least one logical address to at least one absolute address, the computer program product comprising:
   a tangible storage medium readable by a processing circuit and storing instructions for execution by the processing circuit for performing a method comprising for each copy of a translation lookaside buffer (TLB) of at least one TLB:
   initializing a plurality of counters according to a number of entries in the TLB;
   indexing arrays comprising absolute address information of the TLB, the indexing responsive to the counters;
   comparing each index against a request for invalidation, the comparing performed in parallel for each of the plurality of counters, the comparing resulting in one of no match, one match, and a plurality of matches;
   unsetting at least one validation bit in the TLB in response to the comparing resulting in one match;
   incrementing a counter comprising index information in response to the comparing resulting in no match; and
   identifying a set of TLB entries for invalidation and incrementally unsetting at least one validation bit for each TLB entry in the set in response to the comparing resulting in a plurality of matches;
   wherein the unsetting of the at least one validation bit invalidates a mapping between at least one logical address and at least one absolute address, the mapping corresponding to the identified set of TLB entries.

19. The computer program product of claim 18, wherein a latency for the method comprises no more than Q/(N*M) cycles, wherein the TLB comprises N physical arrays, where N is at least one, each physical array comprises M read ports, where M is at least one, and each read port can access an entry to the TLB with Q indices, where Q is at least one.

* * * * *